United States Patent [19]

Cahill, III et al.

[11] Patent Number: 4,792,981
[45] Date of Patent: Dec. 20, 1988

[54] MANIPULATION OF RUN-LENGTH ENCODED IMAGES

[75] Inventors: Benjamin M. Cahill, III, Madison; Jeffrey R. Hedden, Randolph, both of N.J.

[73] Assignee: AM International, Inc., Chicago, Ill.

[21] Appl. No.: 99,137

[22] Filed: Sep. 21, 1987

[51] Int. Cl.$^4$ .......................... G06K 9/30; G06K 9/48
[52] U.S. Cl. ...................................... 382/56; 340/727; 358/261.3; 382/46; 382/60
[58] Field of Search ....................... 382/44, 46, 56, 60; 358/261; 340/703, 727, 731, 747

[56] References Cited

U.S. PATENT DOCUMENTS

| | | | |
|---|---|---|---|
| 3,142,818 | 7/1964 | Holt | 382/60 |
| 4,271,476 | 6/1981 | Lotspiech | 382/46 |
| 4,516,173 | 5/1985 | Abe et al. | 340/731 |
| 4,562,484 | 12/1985 | Rallapalli et al. | 358/261 |
| 4,573,201 | 2/1986 | Hashiyama et al. | 358/261 |
| 4,590,606 | 5/1986 | Rohrer | 382/56 |

Primary Examiner—Leo H. Boudreau
Assistant Examiner—Donald J. Daley
Attorney, Agent, or Firm—Niro, Scavone, Haller, Niro & Rockey, Ltd.

[57] ABSTRACT

A method and apparatus for manipulating run-length encoded rasterized images. Sizing, slanting, rotating or otherwise transforming an image outline to a new orientation is accomplished without converting image information into a bit map or discrete pixel format. An image outline is characterized in terms of visible and invisible vectors along an input raster scan line by relating run-lengths in a previous input scan line with run-lengths in a current input scan line. The resulting vector characterization allows determination of crossover points on output raster scan lines for the manipulated image by means of transform coefficients. Memory bins store these crossover points, and these bins are sorted to construct a new run-length encoded image outline.

14 Claims, 8 Drawing Sheets

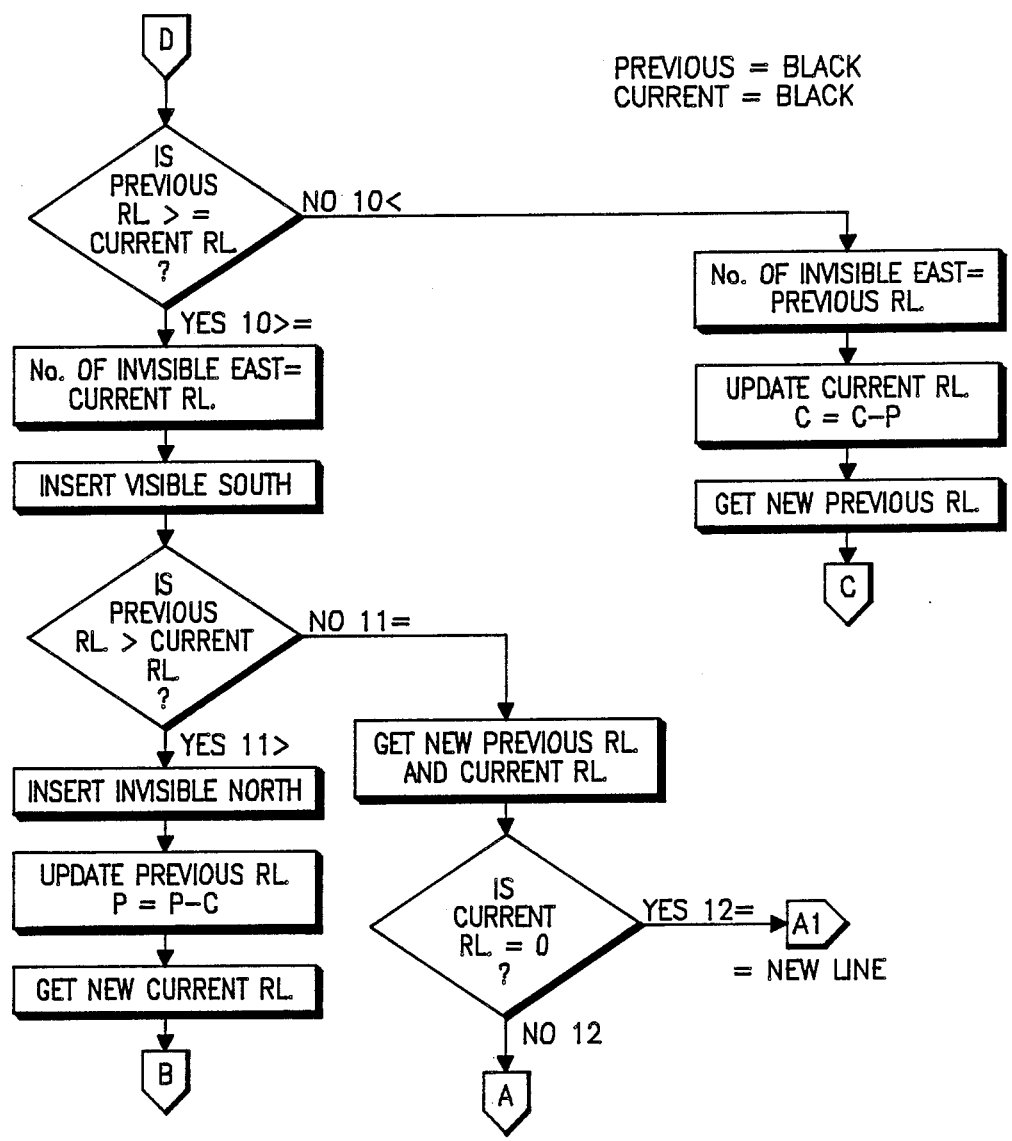

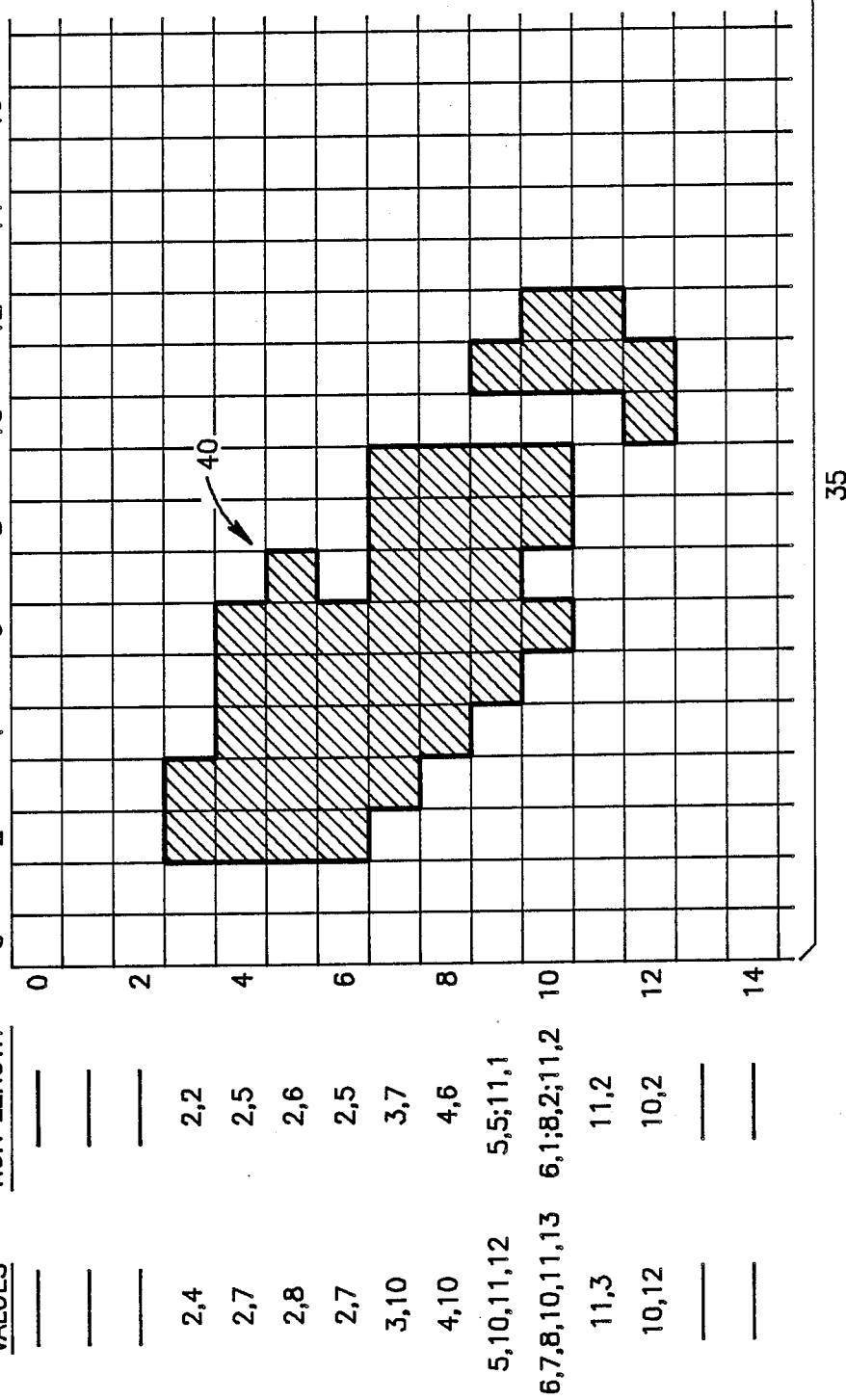

MANIPULATION OF RUN-LENGTH ENCODED IMAGES

The present invention is generally related to a method of manipulating run-length encoded rasterized images and more particularly is related to sizing, slanting, rotating or otherwise transforming a run-length encoded image into another run-length encoded image without having to convert the information into a bit map or discrete pixel format.

Manipulation of a rasterized image normally requires the execution of various operations on individual pixels of the image. For example, rotation has typically been performed by multiplying a coordinate transformation matrix times a bit map characteristic of the image to be rotated. Alternatively, image rotation has been accomplished by using a rotator component consisting of a set of shift registers and an associated memory (see, for example, H. S. Hou, *Digital Document Processing,* Wiley & Sons, New York, 1983, which is incorporated by reference herein). These prior methods of image manipulation require substantial memory and numerous calculation steps in order to achieve the desired repositioning of the image. Although run-length encoding provides an advantageous data compression ratio in rasterized images, these advantages can be reduced since image manipulation by converting to an expanded bit map requires numerous additional computational steps and/or substantial additional memory. These additional computational steps make the image manipulation process highly inefficient and not cost effective.

It is therefore an object of the invention to provide a new method of manipulating or transforming run-length encoded images.

It is a further object of the invention to provide a novel method of image manipulation without converting to any bit map representation of the image.

It is an additional object of the invention to provide an improved method of converting a run-length encoded image into another form of run-length encoded image characteristic of a new image orientation.

It is another object of the invention to provide a novel three step method of image transformation using run-length encoding conventions to characterize the image throughout the three step method.

In accordance with the invention a method is provided for manipulation of run-length encoded images without having to characterize the image in terms of a bit map format. The preferred method involves three steps including: (1) establishing each scan line of the input image as a series of "visible" and "invisible" vectors by comparing run-lengths in a current scan line with run-lengths for a previous scan line, (2) determining color transition information for a manipulated or transformed output image by means of transform coefficients and storing this transition information in memory bins to characterize each of the output scan lines and (3) sorting the bins from one end of the output scan to the other and constructing a new run-length encoded image from the sorted run-length encoded information. Run-length encoding, as referred to herein, can include conventional run-length encoding where each code datum refers to the distance, or run-length, between transitions from one color to another within a raster scan line. Alternatively, run-length encoding can refer to an encoding method where each code datum refers to the position of one such color transition relative to a fixed reference point, for example, the left end of the scan line.

Further objects and advantages of the present invention, together with the organization and manner of operation thereof, will become apparent from the following detailed description of the invention when taken in conjunction with the accompanying drawings wherein like reference numerals designate like elements throughout the several views.

BRIEF DESCRIPTION OF THE DRAWINGS

FIG. 3D shows a reconstructed image in an output plane.

DETAILED DESCRIPTION OF PREFERRED EMBODIMENTS

Figure 1:
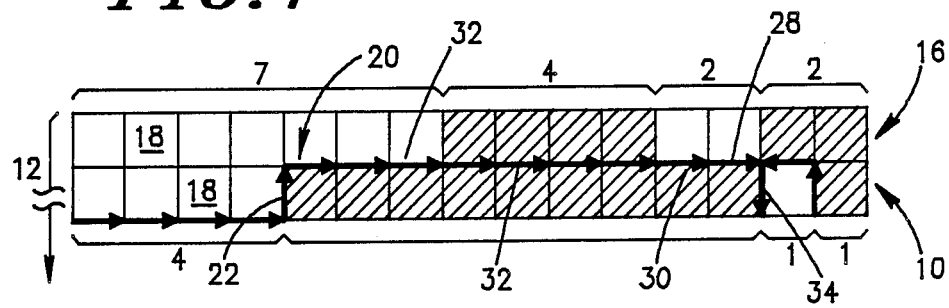
FIG. 1 illustrates the assignment of visible and invisible vectors along a current input raster scan line.

Referring now to the drawings and more particularly to FIG. 1, there is illustrated a portion of an image and various display information associated with the first part of a preferred three step method of carrying out the invention. In a first step a current scan line 10 of an input pixel grid 12 is characterized as a portion of an image by assigning vector type data to each of the scan lines 10. In the preferred embodiment this is accomplished using a series of "visible" vectors and "invisible" vectors which are determined by comparing run-lengths in the current scan line 10 with the run-lengths in a previous scan line 16. In performing this step, the visible vectors are vectors along each side of a pixel 18 which define a border portion of an image outline 20 for an input image 21 (see FIG. 3A). The invisible vectors are those vectors which are buried in white space or black space, therefore not playing an active role in defining the border of the image outline 20. Along the scan line 10 are combinations of visible and invisible forms of North (N) vectors, South (S) vectors, East (E) vectors or West (W) vectors. As shown in FIG. 1, the run-length transitions on the current scan line 10 create a visible N vector 22 or a S vector 34, characterizing the vertical edge or border of a black or white region. Invisible W vectors 28 are used only for retracing, and run-length transitions on the previous scan line 16 determine the existence of visible W vector 28, visible E vector 30 and invisible E vector 32.

Figure 2A:
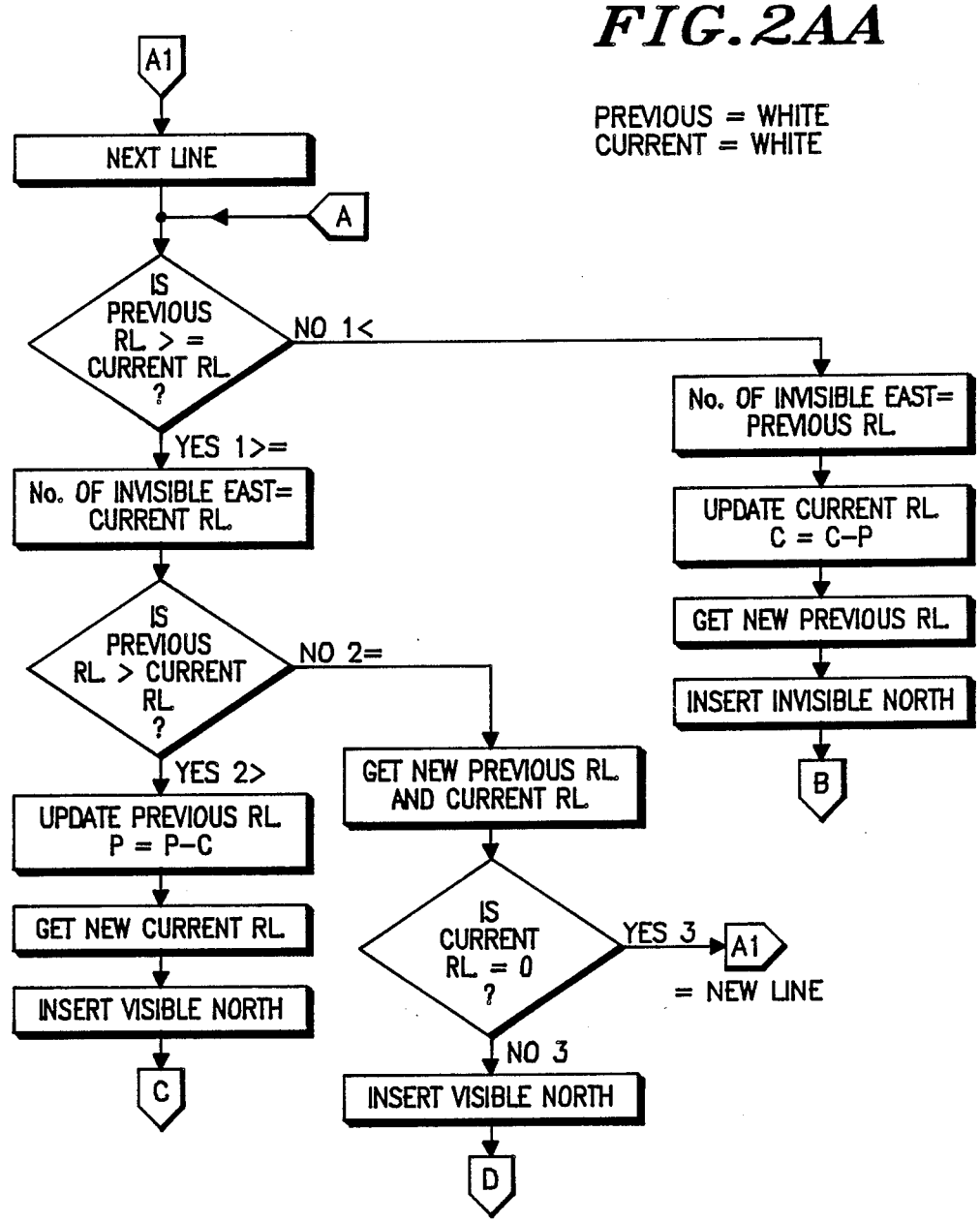
FIGS. 2AA–AD is a logical flow diagram showing the steps in assigning visible and invisible vectors to a selected outline associated with input raster scan lines.

FIGS. 2AA to 2AD are flow charts which illustrate the details of the first step of characterizing each of the various scan lines in terms of the various visible and invisible vectors. For example, referring to FIG. 1, the scan line 16 is denoted as a previous scan line, and the scan line 10 is taken as the current scan line. The first run-length for the current scan line 10 is four and has all white pixels, and likewise the adjacent pixels 18 of the previous scan line 16 are white. This beginning run-length combination is the starting combination in FIG. 2AA. The flow chart is followed to characterize the next run-length of the current scan line 10. The question posed in the first decision block is whether the previous run-length has a magnitude greater than or to equal to the current run-length. The previous run-length is seven and the current run-length is four; therefore, the answer is yes to the decision block question, and one then branches to the left. The number of the invisible E vectors 32 is therefore equal to the current run-length of four. The next decision box is wether the previous run-length is greater than the current run-length. In this case the previous run-length was seven, and the current run-length is four; therefore, we update the previous run-length to be seven minus four, or three. The new current run-length is nine, and we insert the visible N vector 22 which defines the left hand edge of the first black area of the current scan line 10. We next proceed to FIG. 2AC.

In FIG. 2AC the beginning of the previous run-length of the pixels 18 is white and the current run-length of the pixels 18 is black. The previous run-length is three, and the current run-length is nine. Thus, the answer to the first decision block is no, and we then branch to the right of the decision block. Consequently, the number of the visible E vectors 30 is equal to the previous run-length of three. Since we are comparing the current scan line 10 to the previous scan line 16, the visible E vector 30 will appear only at the top edge of the pixels 18 in the current scan line 10 or along the bottom edge of the pixels 18 of the previous scan line 16. The current run-length is updated by subtracting three, or nine minus three is six which is the new current run-length. The new previous run-length is now four, and we proceed to branch to FIG. 2AD.

In FIG. 2AD the previous run-length of four was black, and the current run-length consists of six black ones of the pixels 18. The answer to the logical decision block is the previous run-length of four is not greater than the current run-length of the six. We therefore branch to the right, and the number of the invisible E vectors 32 is equal to the previous run-length of four. We update the current run-length by subtracting the previous run-length of four and obtain an answer of two for the current run-length. The new previous run-length is now two, and we return to FIG. 2AC.

In FIG. 2AC the previous run-length is white, and the current run-length is black. The previous run-length of two is equal to the current run-length of two. Consequently, the number of the unit visible E vectors 30 is equal to the current run-length of two, and we insert a visible S vector 34 to define the right vertical border of the first black run-length of the current scan line 10. The next decision block asks whether the previous run-length of two is greater than the current run-length of two, and again the answer is no. Therefore, we obtain new, previous and current run-lengths of two and one, respectively, and return to 2AB. This process is continued in the manner discussed for each of the various pairs of the current scan line 10 and the previous scan line 16 in order to characterize the entire input pixel grid 12.

As the various visible and invisible vectors are being characterized by the aforementioned process, we can proceed to the second aspect of manipulating the run-length encoded image 21. That is, we can determine the color transition points and then determine the scan line crossover points for the outline of the transformed image outline 20 by identifying the intersection points along the new scan lines on an output pixel grid 35 (see FIGS. 3B-D) after transforming the image outline 20. We can store this characteristic information in memory bins for use in generating the appearance of the new orientation of the transformed version of the image outline 20. Therefore, the vectors are manipulated, such as by multiplication by coefficients which serve to size, slant, rotate, or otherwise transform the various vectors to achieve a different set of X and Y coordinates in the plane of the output pixel grid 35. Coefficients are associated with the visible N vector 22 and the visible E vector 30; and the coefficients for the visible S vector 34 and the visible W vector 28 are the inverse of the visible N vector 22 and the visible E vector 30, respectively. In the preferred embodiment sizing, slanting and rotating can be accomplished in one step by the proper choice of coefficients without extra manipulation steps being necessary.

Figure 4:
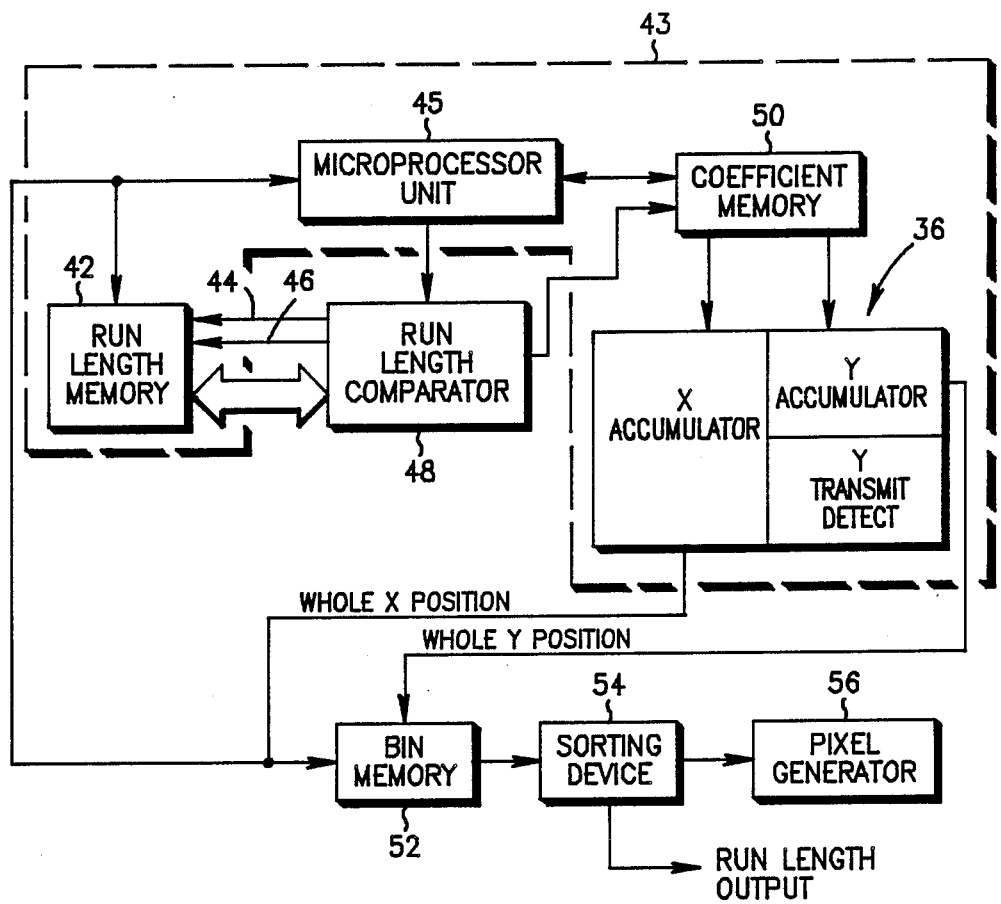
FIG. 4 shows a component/functional block diagram for apparatus to characterize run-length encoded data for a transformed image outline.

Preferably, an X and Y accumulator 36 shown in FIG. 4 keeps track of the displaced positions of the portions of the image outline 20. For example, each time one of the visible vectors causes a transition from one of output scan lines 38 to another, there is a change in whole number portion of the Y accumulator. The X position of the displaced vector at or near the point of transition between the output scan lines 38 is recorded in a "bin", or a particular memory portion of the computer system. A bin is a memory portion in the computer system corresponding to a particular one of the output scan lines 38. Since the recorded X position was transformed from the image outline 20 of the input image 21, the X position represents a color transition point in the output raster scan line 38. Therefore, as the given current input scan line 10 is traversed and the visible vectors are detected, they are displaced to their new positions on the output pixel grid 35. The new manipulated or transformed version of the image outline 20 is then recorded in the appropriate bins as the X positions of one of the translated visible vectors. The invisible vectors cause the same result in the X and Y position accumulator as the various visible vectors, but the results of the invisible vectors are not recorded in the bins. Preferably only when a visible boundary of the input form of the image outline 20 is outlined do we record the vector position in the bin. During this entire procedure both the input and the output form of the image outline 20 are expressed only in compressed type format and not in a pixel type format.

Figure 3A:
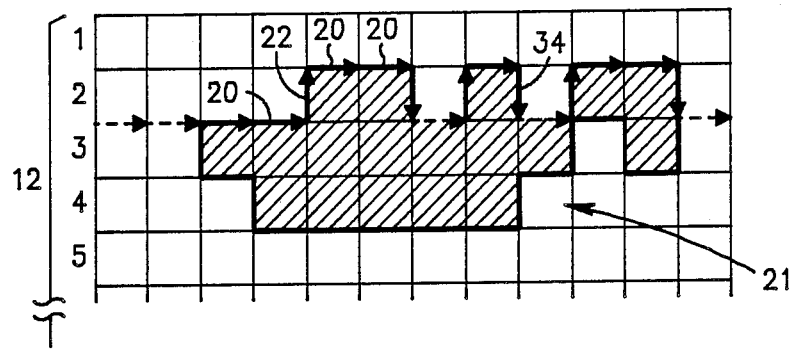
FIG. 3A shows an example of a portion of an output image outline.
Figure 3B:
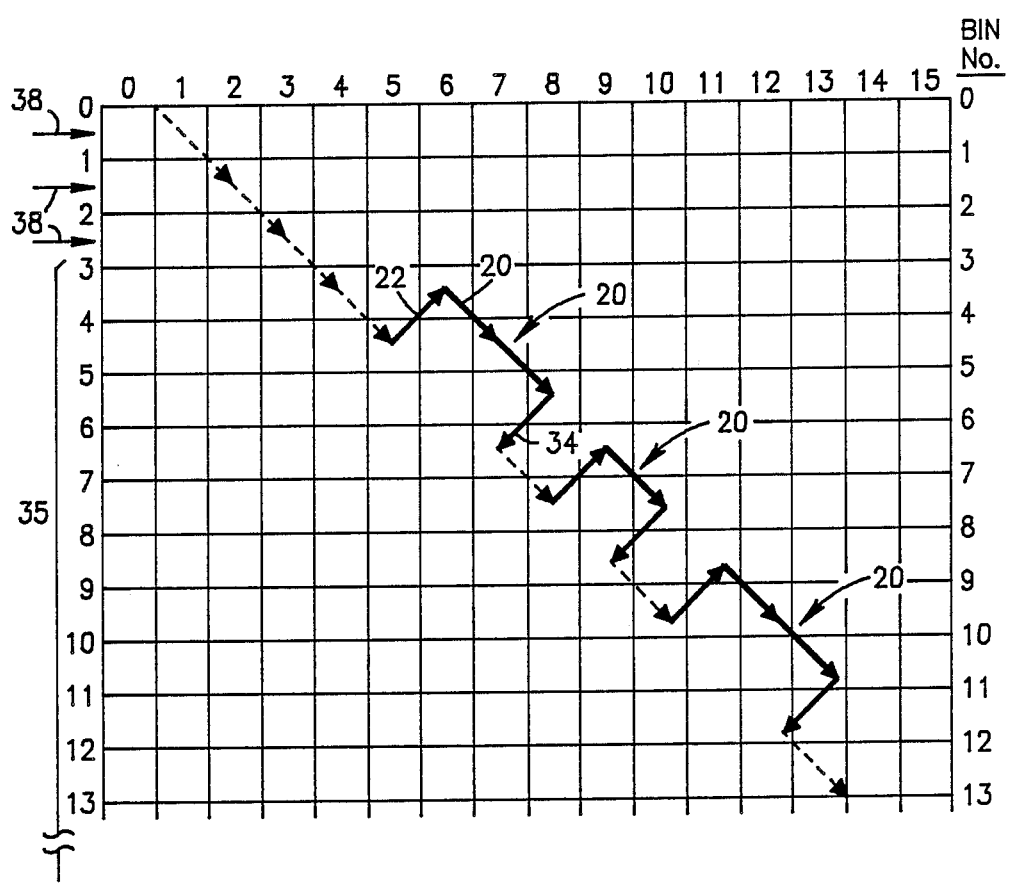
FIG. 3B shows a transformed and rotated form of the image outline of FIG. 3A.

The final preferred step involves sorting the run-length information in the bins to construct the final form of the image outline 20. A particular example of performing the third step is illustrated in FIGS. 3A-D and in Tables I and II. In FIG. 3A part of the visible vectors are shown delineating the border of the image outline 20. A transformed version of the image outline 20 on the output pixel grid 35 is shown in FIG. 3B, wherein horizontal and vertical input dimensions are increased by one and a half times and then rotated forty-five degrees. We then proceed to create the transformed image outline 20 in a rasterized output form, treating it one vector at a time. Upon crossing each of the output scan lines 38 the associated X crossover points or positions are recorded. As shown in Table I, for the line numbered four of the output scan line 38, we have crossover positions of five and seven. For the output scan line 38 (numbered five in Table I), we have a crossover position of eight and so forth.

Figure 3C:
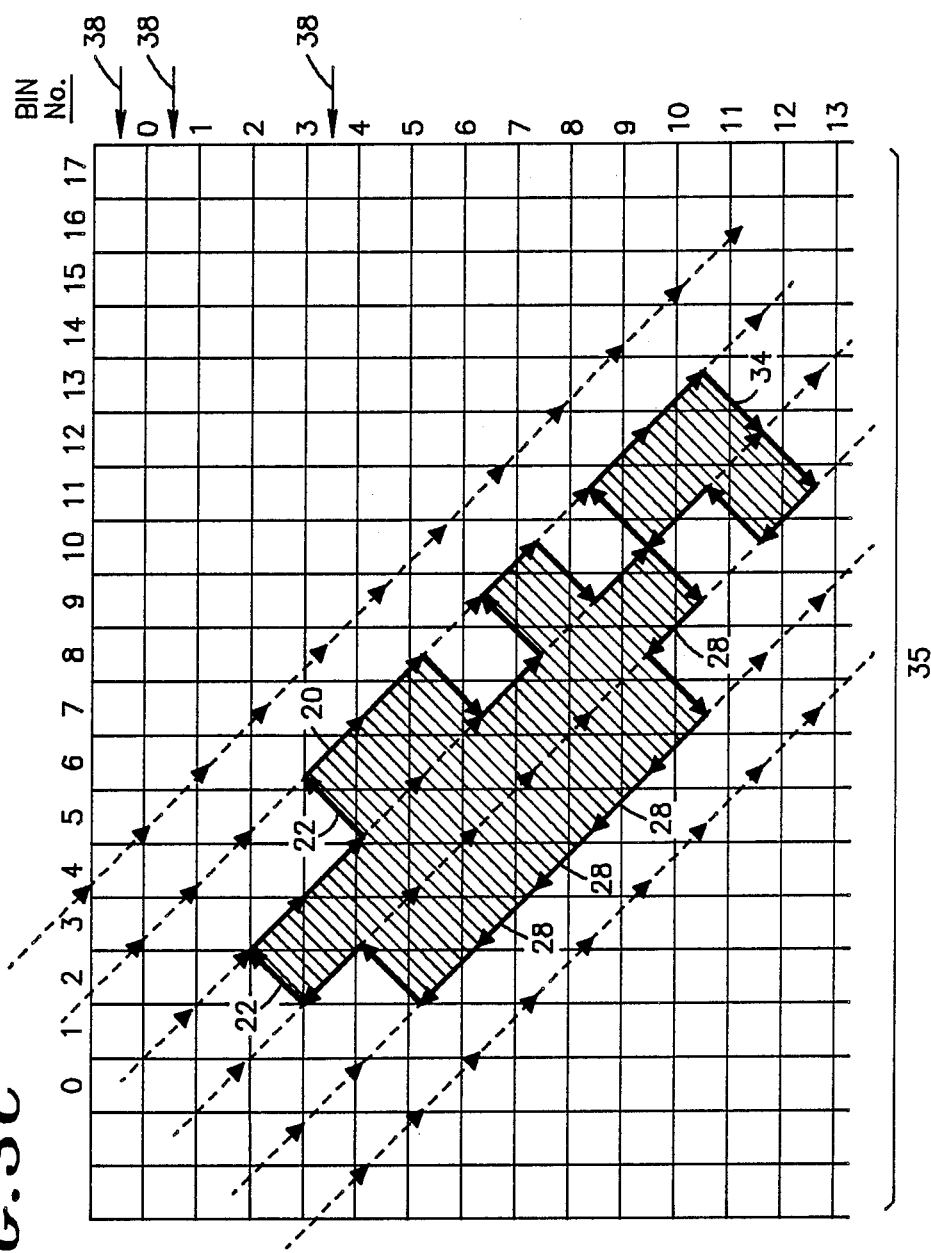
FIG. 3C shows a complete image of the transformed and rotated image shown in FIG. 3B.

In FIG. 3C is shown the closed form of the transformed image outline 20 on the output pixel grid 35. The sorting operation therefore involves establishing the starting point and ending point along each of the selected output scan lines 38. As shown in Table II for line number three, the starting point is two, the ending point is four, and the run-length is or four minus two, or two. This operation is carried out for each run-length along the various current output scan lines 38. The resulting reconstructed image in the plane of the output pixel grid 35 is shown in FIG. 3D. Also shown are the sorted bin entries and resulting start points and run-length for the output scan lines 38. Note the slight changes that can occur upon reconstruction of the final image 40.

The entire method can embody multiple passes performed on a given image, flushing the bins if they become overflowed or

TABLE I

| Bin Crossover Points for Portion of Outline | | |
|---|---|---|
| Scan Line No. | Crossover Points | |
| 4 | 5 | 7 |
| 5 | 8 | — |
| 6 | 7 | — |
| 7 | 8 | 10 |
| 8 | 10 | — |
| 9 | 11 | 12 |
| 10 | 13 | — |
| 11 | 13 | — |

TABLE II

| Sorted Bin Values for Complete Outline | | |
|---|---|---|
| Scan Line No. | Start, End Pts. | Run-length |
| 3 | 2,4 | 2 |
| 4 | 2,5;(5,7)* | 3;(2) |
| 5 | 2,8 | 6 |
| 6 | 2,7 | 5 |
| 7 | 3,8;(8,10) | 5;(2) |
| 8 | 4,10 | 6 |
| 9 | 5,10;(11,12) | 5;(1) |
| 10 | 6,7;(8,10);[11–13]* | 1;(2);[2] |
| 11 | 11,13 | 2 |
| 12 | 10,12 | 2 |

*Parentheses indicate a second pair of run-length end points for a scan line and brackets indicate a third pair of run-length end points.

analyzing stripes of the image outline 20 one at a time. If too much memory is used in the above described approach, we can subdivide the task into portions of the image outline 20 and assemble the portions when all sub-images have been completed. One can also sectionalize the analysis of the image outline 20 by taking an entire vertical output with bins accumulating cross over points up to, for example, sixteen points. Once you reach a predetermined storage maximum, the bins are flushed and the information assembled for display of that portion of the image outline 20. This process is then repeated for adjacent vertical slices to minimize memory requirements.

In another form of the invention the scan lines, input and/or output form, can be oriented in directions other than horizontal. Further, the orientation of the input scan lines 10 need not match the orientation of the output scan lines 38.

Apparatus for carrying out the characterization of transformed run-length encoded data for an image outline is illustrated schematically in FIG. 4. A run-length memory 42 (such as a standard solid state random access memory, tape unit or other conventional memory) stores the run-length encoded input form of the image outline 20. Under control of a microcomputer 43, using a conventional microprocessor 45, such as a Motorola 68000, a current pointer command 44 and a previous pointer command 46 are generated to access the sequentially stored run-length encoded data for the current scan line 10 and the previous scan line 16. In a conventional manner, such as by execution of a software program in the microprocessor 45, the pointer commands are incremented as the run-length encoded data is used.

Figure 2A:
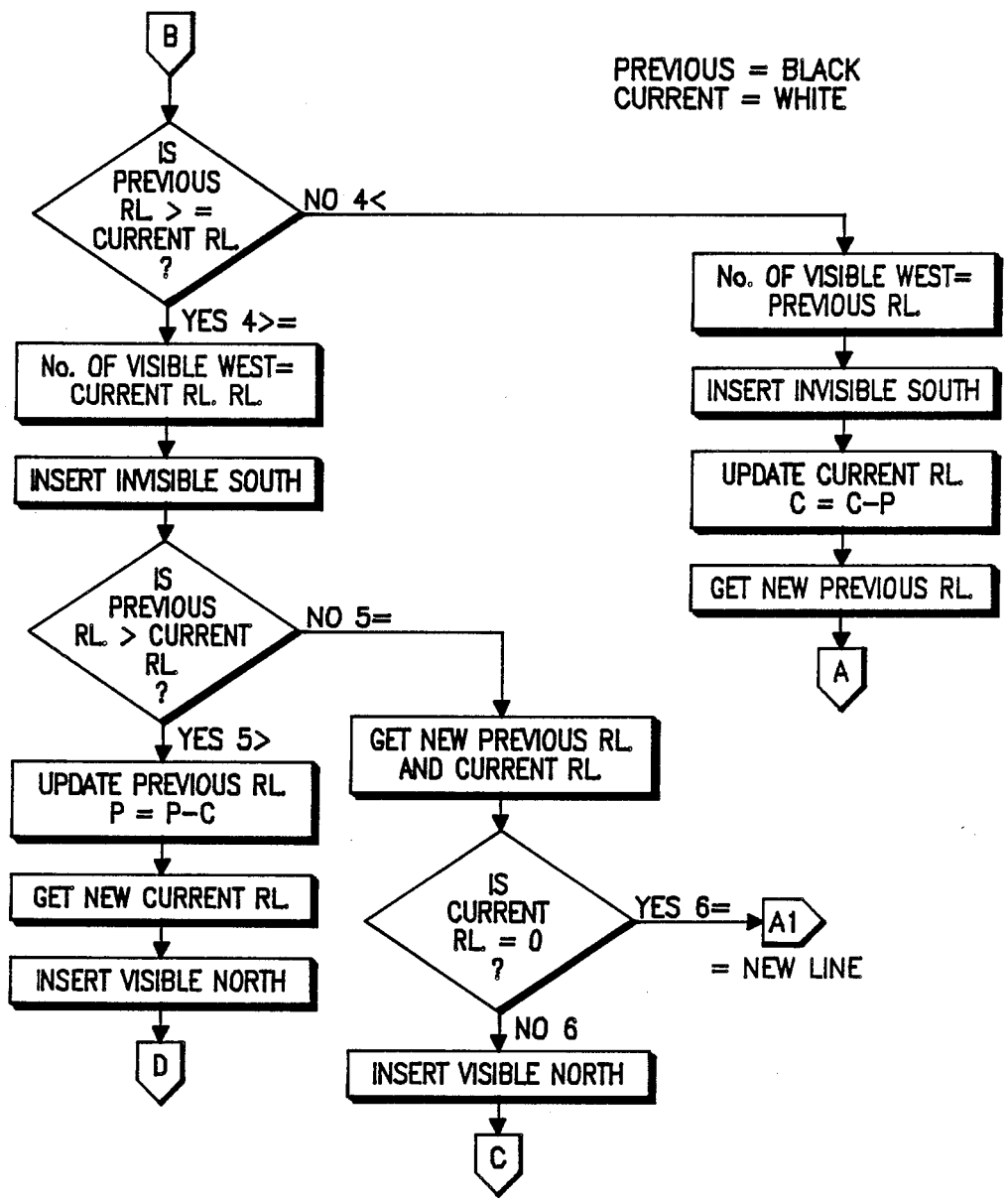
Figure 2A:
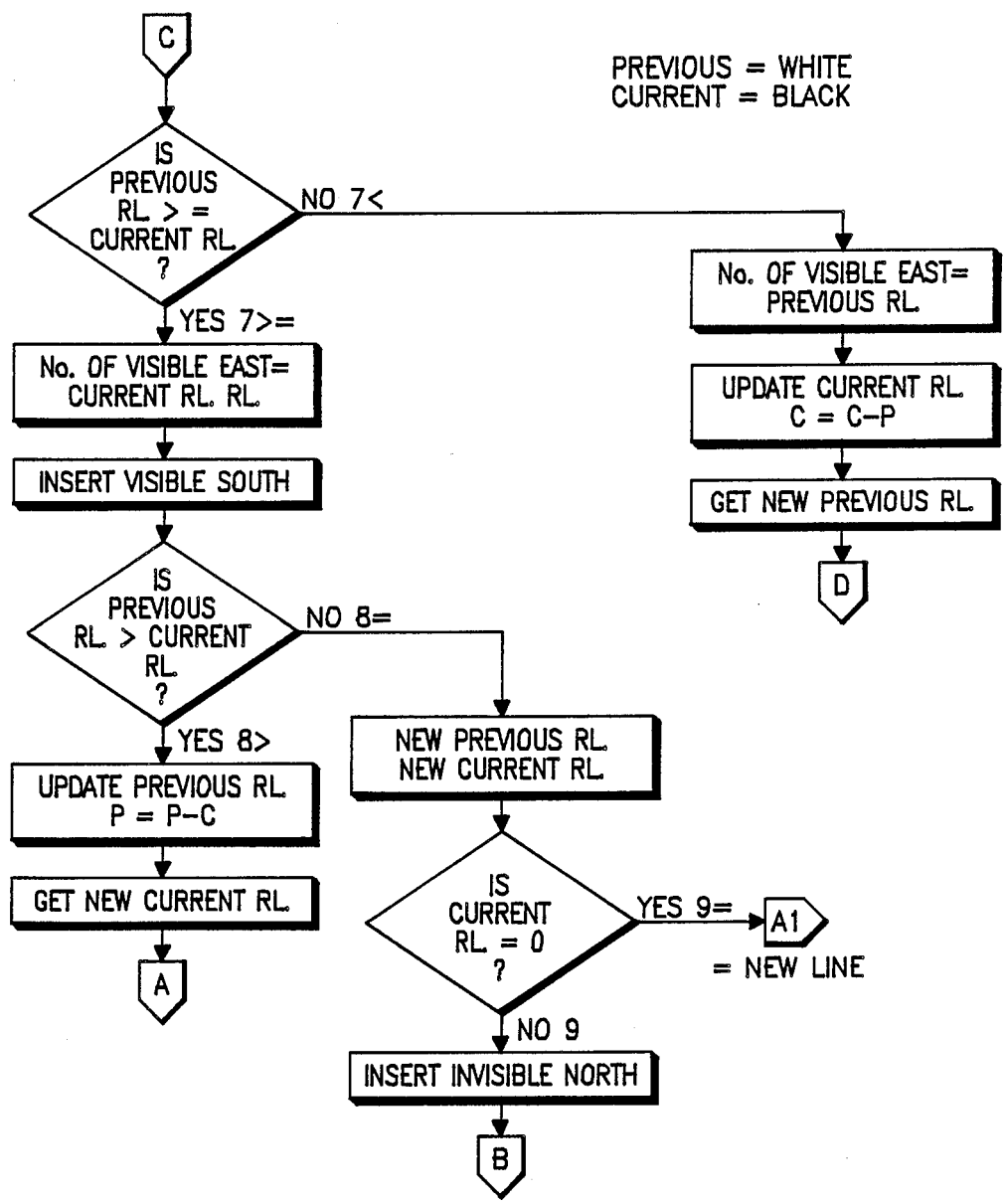

The run-lengths for the current scan line 10 and the previous scan line 16 are compared by a run-length comparator 48 (dedicated conventional hardware) or, the microprocessor 45 executing a program having the logic defined in accordance with FIG. 2. This comparison provides a characterization of the current scan lines 10 in terms of a series of visible and invisible vectors, as described hereinbefore. For each of these vectors a coefficient memory 50, such as a random access memory (RAM) supplies a pair of coefficients to the X and Y coordinate accumulator 38 which contains the X, Y values of the output form of the image outline 20. These coefficients in effect track the position of the transformed scan line across the output pixel grid 35.

If a selected vector is one of the visible vectors, and it causes a transition of the whole number portion of the Y section of the accumulator 38, then a transition has occurred from one scan line to another as a consequence of the transformation. When this Y transitions occur, a bin memory 52 (such as a contentional RAM) is accessed by the microprocessor 45, and the value of the whole number X in the accumulator 38 is recorded. If multiple Y transitions are caused by a single vector, a recording must be made in each of the bins relating to each of the output scan lines 38 to which a transition has occurred.

Once the output form of the image outline 20 has been completely processed as described hereinbefore, the bin memory 52 contains all the information needed to construct the transformed version of the image outline 20. A sorting device 54 (dedicated conventional hardware) or, the Motorola 68000 microprocessor 45 executing a computer software sorting routine, is used to sort the contents of the bins into a sequence of run-length values. A pixel signal generator 56 (dedicated conventional hardware) or, the microprocessor 45 again executing appropriate computer software, can receive the output data from the sorting device 54 and generate the actual image bit map for output and display.

While preferred embodiments of the present inventions have been illustrated and described, it will be understood that changes and modifications can be made without departing from the inventions in their broader aspects. Various features of the inventions are set forth in the following claims.

What is claimed is:

1. A method of characterizing run-length encoded data for a transformed form of an outline of an image constructed from a plurality of scan lines of pixels on a pixel grid, comprising the steps of:

characterizing color changes for each of said scan lines of said image using visible and invisible unit vectors, an invisible unit vector disposed between the pixels of like color and a visible unit vector disposed between the pixels of unlike color, said visible unit vectors constituting said outline;

determining scan line crossover information for each of said characterized scan lines after transformation of said image outline;

storing said crossover information in memory bins; and sorting said crossover information and calculating said run-length encoded data using said crossover information stored in said memory bins.

2. The method as defined in claim 1 further including the step of outputting said run-length encoded data for display.

3. The method as defined in claim 1 wherein said crossover information comprises crossover points on new ones of said scan lines.

4. The method as defined in claim 3 wherein said step of determining scan line crossover points comprises identifying the intersection points along the scan lines of said pixel grid of each said transformed image outline portion.

5. A method for characterizing an outline of an image constructed from a plurality of scan lines of pixels having selected run-lengths of colored pixels, comprising the steps of:

comparing a current scan line with a previous scan line by determining the color of each of said pixels of said current scan line relative to the color of the immediately adjacent one of said pixels in said previous scan line;

assigning at least one visible vector to each of said pixels of said current scan line having a different color than the adjacent one of said pixels of said previous scan line, said visible vector being a N or S vector at the end of said colored pixel run-length and said visible vector being an E or W vector between each of said pixels of said current scan line having a different color than the immediately adjacent one of said pixels on said previous scan line;

assigning an invisible vector to each of said pixels of said current scan line having the same color as the immediately adjacent one of said pixels of said previous line, said invisible vector being a N or S vector between immediately adjacent ones of said pixels on the same said scan line before the end of said run-length and said invisible vector further being an E or W vector between each of said pixels having the same color in said current and previous scan lines; and calculating run-length encoded data using said visible and invisible vectors assigned to said current scan line.

6. The method of defined in claim 5 further including the step of outputting said run-length encoded data for display.

7. A method of characterizing run-length encoded data for a transformed form of an outline of an image constructed from a plurality of scan lines of pixels, comprising the steps of:

characterizing run-length encoded representations for each of said scan lines of said image using visible and invisible unit vectors, an invisible unit vector disposed between pixels of like color and a visible unit vector disposed between pixels of unlike color; and storing X and Y accumulator values for each of said scan lines and determining run-length encoded information from said X and Y accumulator values for each of the original form of said scan lines crossed by the transformed form of said scan lines.

8. The method as defined in claim 7 further including the step of outputting said run-length encoded data for display.

9. A method of characerizing run-length encoded data for a transformed form of an outline of an image constructed from a plurality of scan lines of pixels having selected run-lengths of colored pixels, comprising the steps of:

characterizing run-length encoded representations for each of said scan lines of said image using visible and invisible unit vectors, an invisible unit vector disposed between pixels of like color and a visible unit vector disposed between pixels of unlike color;

storing X and Y accumulator values for each of said scan lines and determining run-length encoded information from said X and Y accumulator values for each of the original form of said scan lines crossed by the transformed form of said scan lines; and sorting said run-length encoded information preparatory for raster output of said transformed form of said scan lines.

10. A method of characterizing run-length encoded data for a transformed form of an outline of an image constructed from a plurality of scan lines of pixels on a pixel grid, comprising the steps of:

characterizing color changes for each of said scan lines as a portion of said image by assigning run-length data to each of said scan lines;

determining scan line crossover points of said characterized scan line after transformation of said image outline; and generating said run-length encoded data from said scan line crossover locations.

11. The method as defined in claim 10 wherein said step of determining scan line crossover information comprises identifying the intersection points along the scan lines of said pixel grid of each said transformed image outline portion.

12. The method as defined in claim 10 further including the steps of outputting said run-length encoded data for display of said transformed image.

13. A method of characterizing run-length encoded data for a transformed version of an outline of an image constructed from a plurality of scan lines of pixels on a pixel grid, comprising the steps of:

characterizing each of said scan lines as a portion of said image by assigning run-length data to each of said scan lines, including at least one border portion of said image outline;

determining scan line crossover locations of said characterized scan lines after transformation of said image outline; and generating said run-length encoded data from said scan line crossover locations.

14. An apparatus for characterizing run-length encoded data for a transformed version of an outline of an image constructed from a plurality of scan lines of pixels on a pixel grid, comprising:

means for characterizing each of said scan lines as a portion of said image by assigning run-length data to each of said scan lines including at least one border portion of said image outline;

means responsive to said characterizing means for determining scan line crossover locations of said characterized scan lines after transformation of said image outline; and means responsive to the output from said determining means for generating said run-length encoded data from said scan line crossover locations.

* * * * *